(12) United States Patent
Maucher et al.

(10) Patent No.: US 10,030,615 B2
(45) Date of Patent: Jul. 24, 2018

(54) COOLING SYSTEM OF A MOTOR VEHICLE

(71) Applicant: Mahle International GmbH, Stuttgart (DE)

(72) Inventors: Ulrich Maucher, Korntal-Muenchingen (DE); Eberhard Pantow, Winnenden (DE)

(73) Assignee: Mahle International GmbH (DE)

( * ) Notice: Subject to any disclaimer, the term of this patent is extended or adjusted under 35 U.S.C. 154(b) by 100 days.

(21) Appl. No.: 15/177,971

(22) Filed: Jun. 9, 2016

(65) Prior Publication Data

US 2016/0363101 A1  Dec. 15, 2016

(30) Foreign Application Priority Data

Jun. 10, 2015 (DE) .................. 10 2015 210 646

(51) Int. Cl.
| | |
|---|---|
| F01P 9/00 | (2006.01) |
| F02M 26/22 | (2016.01) |
| F02D 41/22 | (2006.01) |
| F01P 11/18 | (2006.01) |
| F02M 26/49 | (2016.01) |
| F02M 26/25 | (2016.01) |
| F02M 26/28 | (2016.01) |
| F02D 41/00 | (2006.01) |

(52) U.S. Cl.
CPC .............. *F02M 26/22* (2016.02); *F01P 11/18* (2013.01); *F02D 41/0055* (2013.01); *F02D 41/22* (2013.01); *F02M 26/25* (2016.02); *F02M 26/28* (2016.02); *F02M 26/49* (2016.02); *F02D 41/0065* (2013.01); *Y02T 10/47* (2013.01)

(58) Field of Classification Search
CPC ........ F02M 26/22; F02M 26/28; F02M 26/25; F02M 26/49; F02D 41/0055; F02D 41/22; F02D 41/0065; F01P 11/18; Y02T 10/47

USPC ......... 123/568.12–568.18, 569; 60/599–604, 60/605.2

See application file for complete search history.

(56) References Cited

U.S. PATENT DOCUMENTS 7,461,640 B1 * 12/2008 Agee ...................... F01P 11/18
 123/568.12
2014/0288801 A1 9/2014 Sasaki

FOREIGN PATENT DOCUMENTS

| DE | 102009001675 | 6/2011 |
| JP | 2008-261297 A | 10/2008 |
| WO | WO-2013158082 A1 | 10/2013 |

OTHER PUBLICATIONS

European Search Report for EP-16170958.9, dated Oct. 11, 2016.
German Search Report for DE-102015210646.2, dated Apr. 4, 2016.
English abstract for JP2008-261297.

* cited by examiner

*Primary Examiner* — Hung Q Nguyen
(74) *Attorney, Agent, or Firm* — Fishman Stewart PLLC

(57) ABSTRACT

A cooling system of a motor vehicle may include a coolant circuit including an exhaust-gas recirculation path and an exhaust-gas recirculation cooler arranged therein. A pressure detection device may be provided for detecting a coolant pressure in the coolant circuit. An actuating device may be connected communicatively to the pressure deduction device. A valve device may be connected communicatively to the actuating device and configured to control an exhaust-gas stream passing into the cooler. The actuating device may be configured to at least partially close the valve device and reduce the exhaust-gas stream flowing to the cooler in response to the pressure detection device detecting a predefined pressure drop.

20 Claims, 1 Drawing Sheet

COOLING SYSTEM OF A MOTOR VEHICLE

CROSS-REFERENCE TO RELATED APPLICATIONS

This application claims priority to German Patent Application No. 10 2015 210 646.2, filed Jun. 10, 2015, the contents of which are hereby incorporated by reference in its entirety.

TECHNICAL FIELD

The present invention relates to a cooling system of a motor vehicle, having a cooling circuit, having an exhaust-gas recirculation path and having an exhaust-gas recirculation cooler incorporated into said exhaust-gas recirculation path. The invention also relates to a motor vehicle having a cooling system of said type and to a method for operating a cooling system of said type.

BACKGROUND

US 2014/0288801 A1 has disclosed a generic cooling system of a motor vehicle, having an exhaust-gas recirculation arrangement and having an exhaust-gas recirculation cooler integrated into the exhaust-gas recirculation arrangement.

A generic cooling system of a motor vehicle is also known from JP 2008-261297 A. In general, cooling components, such as in particular exhaust-gas coolers manufactured from high-grade steel, which are incorporated into a coolant circuit of a motor vehicle have a relatively high replacement value. This is based not only on the high material costs but also on likewise high manufacturing costs. For this purpose, it is desirable for such cooling components to be effectively protected against damage, even if, as a result of faults in the motor vehicle, they are operated not in the intended manner. Here, in particular in the case of an exhaust-gas recirculation cooler, there is a high risk of damage if a fault occurs in the coolant circuit. This may be caused for example by faults in the actuation arrangement, or failures of valves or pumps, or else as a result of selection of, or damage to, relatively inexpensive components in the line system, such as hoses, clamps, screw connections or the like. Here, exhaust-gas recirculation coolers are at particular risk because they exhibit relatively high power and simultaneously relatively low thermal inertia, and, for example in the event of a fault in the coolant circuit, heat up within a few seconds to such an extent that they can sustain damage. Even if it is the case here that the engine switches over very quickly into an emergency running mode, for example associated with a power reduction, it cannot be ensured that the exhaust-gas cooler remains undamaged. Special protection of the exhaust-gas recirculation cooler has therefore hitherto not been provided at all.

SUMMARY

The present invention is therefore concerned with the problem of specifying, for a cooling system of the generic type, an improved or at least alternative embodiment which is distinguished in particular by specific protection for an exhaust-gas recirculation cooler.

Said problem is solved according to the invention by way of the subject matter of the independent claim(s). The dependent claims relate to advantageous embodiments.

The present invention is based on the general concept, in a cooling system of a motor vehicle, such as is known per se, having a coolant circuit, having an exhaust-gas recirculation path and having an exhaust-gas recirculation cooler incorporated into said exhaust-gas recirculation path, of monitoring a coolant pressure and at least reducing an exhaust-gas stream flowing to the exhaust-gas recirculation cooler immediately if a predefined pressure drop, and thus a deficiency in a coolant supply, are detected. For this purpose, the cooling system according to the invention has a pressure detection device for the detection of the coolant pressure in the coolant circuit, and also has an actuating device which is connected communicatively to the pressure detection device. The actuating device in turn is connected communicatively to a valve device for the control of an exhaust-gas stream passing into the exhaust-gas recirculation cooler, and is at the same time designed such that it at least partially, preferably entirely, closes the valve device, and thus at least reduces, preferably stops, the exhaust-gas stream flowing to the exhaust-gas recirculation cooler, if the pressure detection device detects a predefined pressure drop. In this way, it is possible, in the event of a fault occurring in the coolant circuit, for the exhaust-gas recirculation cooler to be directly and immediately separated from the hot exhaust-gas stream and thereby protected against overheating and damage. This may furthermore be performed independently of hitherto known emergency running modes, which for example reduce the power of an engine. With the cooling system according to the invention, it is thus possible for the exhaust-gas recirculation cooler, which is at particular risk owing to the hot inflowing exhaust-gas stream in the event of a fault in the coolant circuit, to be protected in an effective manner and, in this way, for the operational reliability thereof to be ensured even in the long term and for the maintenance costs thereof to be reduced.

In an advantageous refinement of the solution according to the invention, the valve device is in the form of a flap. A flap of said type may for example be arranged in an exhaust-gas-conducting inlet line to the exhaust-gas recirculation cooler and close off said inlet line if the pressure detection means detects a pressure drop, which exceeds or overshoots a predefined threshold value, in the coolant circuit. In this way, it can be ensured that, owing to pulsations, the pressure fluctuations that commonly arise during operation also do not lead to a shut-off of the exhaust-gas recirculation cooler.

In a further advantageous embodiment of the solution according to the invention, the valve device is preloaded into its closed position by way of a spring. A spring of said type thus serves as a fail-safe element, such that the actuating device holds the valve device in its open position during normal operation, wherein, in the presence of a corresponding signal of the pressure detection device, the actuating device moves the valve device into its closed position or into an at least partially closed position. In the event of a failure of the actuating device, it should however nevertheless be ensured that overheating of, and thus damage to, the exhaust-gas recirculation cooler is reliably prevented, such that, in the event of a failure of the actuating device, said actuating device loses its holding force which holds the valve device in its open position, and the valve device is moved, by way of the above-described spring, into its closed position. In this case, it would self-evidently be necessary for a corresponding warning signal to be transmitted to an engine control unit.

In a further advantageous embodiment of the solution according to the invention, the pressure detection device has at least two pressure sensors which are arranged in the coolant circuit. Here, the two pressure sensors may for example be arranged at the inlet side and outlet side of the exhaust-gas recirculation cooler and thus connected in space-saving fashion thereto. In this case, it would be possible for the two pressure sensors to not only in each case individually detect a pressure drop but also detect the pressure drop of the coolant through the exhaust-gas recirculation cooler. In this way, it is possible in particular for a coolant volume flow in the cooler and/or exhaust-gas recirculation cooler to be checked, whereby it can be ensured that an inadequate coolant supply, for example in the event of damage to or failure of a coolant pump or an incorrectly set coolant valve, is detected, and damage is prevented. Such faults are not inevitably associated with a drop in pressure in the coolant circuit, and therefore cannot be reliably detected by way of a single pressure sensor. However, by way of a differential pressure sensor, it is made possible for the coolant throughflow to be measured, as a pressure drop across the exhaust-gas recirculation cooler or a measurement path situated downstream of the cooler (for example an aperture, V cone or the like), by way of a single sensor. Said measurement signal may also be utilized for directly actuating a pressure capsule on the valve device for the cooler. Since the differential pressure is dependent not only on the throughflow rate but significantly also on the viscosity and thus the temperature and composition of the coolant, it is however predominantly only possible for intense damage to be detected by way of the differential pressure. A moderately reduced coolant stream cannot be reliably detected by way of the differential pressure alone. If the differential pressure signal is applied directly to a pressure capsule, it can be ensured that the exhaust-gas recirculation cooler/cooler is not completely deprived of a coolant supply, which offers protection until the onset of the emergency running mode in the engine. A comparison of the differential pressure, in the ECU, with setpoint values which must not be undershot would be advantageous.

The valve device is expediently integrated into an exhaust-gas recirculation valve. An exhaust-gas recirculation valve, which is commonly connected to an engine control unit (ECU), in this case controls the exhaust-gas fraction to be supplied for combustion again, wherein, in this case, the valve device could be integrated in space-saving fashion in the exhaust-gas recirculation valve. It is self-evidently also conceivable for the exhaust-gas recirculation valve itself to be the valve device, such that, for the valve device, it is possible to resort to the exhaust-gas recirculation valve that is provided in any case, and not only the variety of parts but also costs can be reduced.

Expediently, the pressure detection device and the actuating device are integrated in a pressure capsule or in a differential pressure capsule. In this way, the pressure detection device and the actuating device can be easily and inexpensively combined in a common component, wherein it is alternatively self-evidently also conceivable for the pressure detection device to be in the form of a pressure switch, in particular a so-called piezo element, and for the actuating device to be in the form of an electric actuator. Here, the pressure drop causes a mechanical force to be exerted on the piezo element, which mechanical force is converted by the piezo element into an electrical voltage, and the electric actuator is actuated by way of said electrical voltage. Further alternative embodiments are self-evidently also conceivable.

The invention is furthermore based on the general concept of specifying a method for operating a cooling system of a motor vehicle, in which method a pressure detection device detects a coolant pressure in the coolant circuit and is connected communicatively to an actuating device which at least partially closes the valve device, and thus at least reduces the exhaust-gas stream flowing to the exhaust-gas recirculation cooler, if the pressure detection device detects a predefined pressure drop. By way of the method according to the invention, it is possible for the exhaust-gas recirculation cooler, which is at particular risk owing to the hot inflowing exhaust-gas stream in the event of a fault in the coolant circuit, to be protected in an effective manner and, in this way, for the operational reliability thereof to be ensured even in the long term.

Further important features and advantages of the invention will emerge from the subclaims, from the drawings and from the associated description of the figures on the basis of the drawings.

It is self-evident that the features mentioned above and those yet to be discussed below may be used not only in the respectively specified combination but also in other combinations or individually without departing from the scope of the present invention.

Preferred exemplary embodiments of the invention are illustrated in the drawings and will be discussed in more detail in the following description, wherein the same reference signs are used to denote identical or similar or functionally identical components.

DETAILED DESCRIPTION

Figure 1:
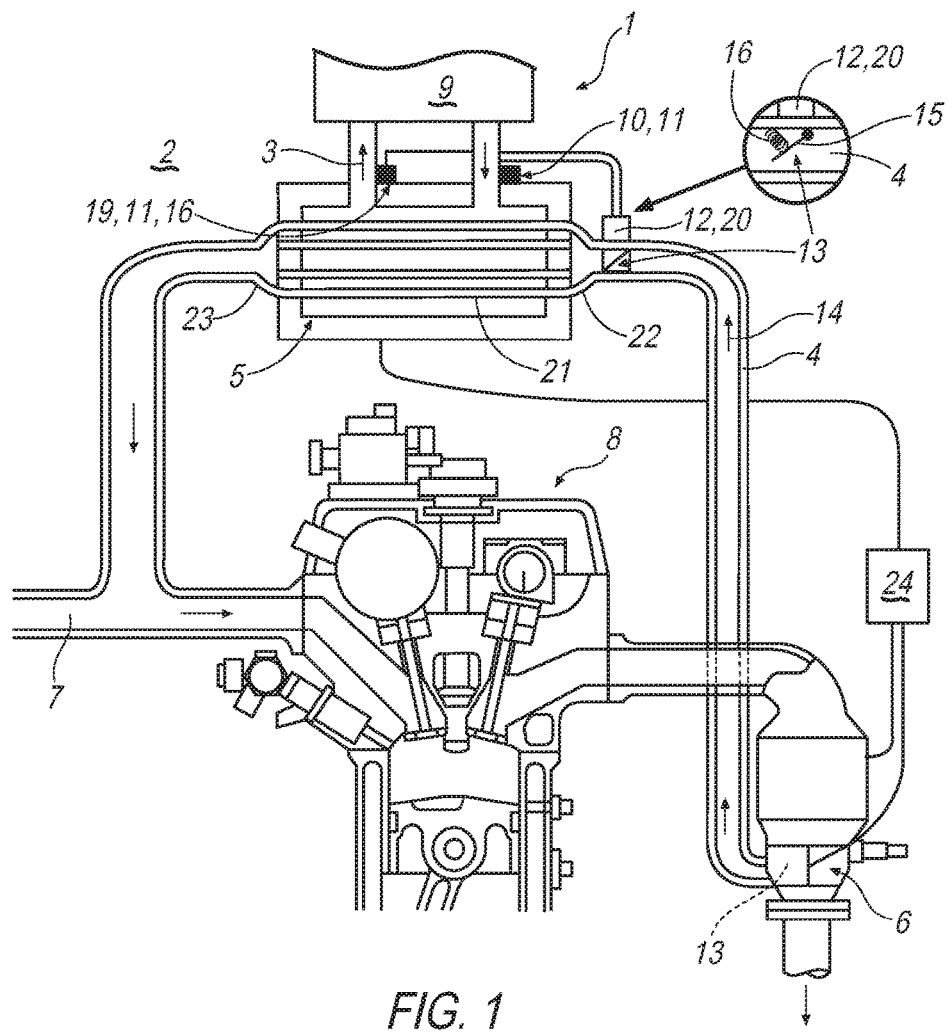
FIG. 1 shows a cooling system according to the invention of a motor vehicle.

Corresponding to FIG. 1, a cooling system 1 according to the invention of a motor vehicle 2 has, in a coolant circuit 3, an exhaust-gas recirculation path 4 and an exhaust-gas recirculation cooler 5 incorporated into said exhaust-gas recirculation path. Here, the exhaust-gas recirculation path 4 runs from an exhaust-gas recirculation valve 6 via the exhaust-gas recirculation cooler 5 to a fresh-air path 7, via which combustion air is supplied to an engine 8 (internal combustion engine). The coolant circuit 3 is furthermore connected to a cooler 9, by way of which the engine 8 is normally also cooled. To now be able, in an effective manner, to prevent damage to the exhaust-gas recirculation cooler 5 in the event of a fault in the coolant circuit 3, it is the case, according to the invention, that a pressure detection device 10 having at least one pressure sensor 11 for detecting a coolant pressure in the coolant circuit 3 is provided. Communicatively connected to the pressure detection device 10 is an actuating device 12 which, in turn, is connected communicatively to a valve device 13 for the control of an exhaust-gas stream 14 passing into the exhaust-gas recirculation cooler 5. Here, according to the invention, the actuating device 12 is designed such that the valve device 12 at least partially, preferably even completely, closes, and thus at least reduces, preferably stops, the exhaust-gas stream 14 flowing to the exhaust-gas recirculation cooler 5, if the pressure detection device 10 detects a predefined pressure drop. Therefore, if a fault occurs in the coolant circuit 3, for example owing to a burst hose or a burst line, which directly leads to a pressure drop in the coolant circuit 3, this is detected by the pressure detection device 10 and leads immediately to a reduction or stoppage of the exhaust-gas stream 14, whereby it is possible to prevent a situation from arising in which hot exhaust gas continues to be supplied to the exhaust-gas recirculation cooler 5 but, owing to the fault in the coolant circuit 3, said exhaust gas can no longer be adequately cooled. This is of particularly great advantage because, in particular, components of the exhaust-gas recirculation cooler 5, such as for example a cooler block 21 thereof, are often composed of high-grade material and can thus be replaced only at great expense.

It has hitherto been the case that such a safety measure tailored specifically to the exhaust-gas recirculation cooler 5 has not been implemented, because, for example, only a temperature of the coolant in the coolant circuit 3 has been monitored. However, if the coolant circuit 3 has a leak, this does not imperatively have to have an influence on the coolant temperature and thus lead to a corresponding warning signal of an engine control unit 24. Such a leak with coolant circuit 3 however gives rise to only inadequate cooling of the exhaust-gas recirculation cooler 5, whereby, in the presence of a continuing unhindered inflow of exhaust gas 14, said exhaust-gas recirculation cooler may overheat and thereby be damaged even in the presence of an emergency running mode triggered by the engine control unit 24.

Considering the detail illustration of the valve device 13 in FIG. 1, it can be seen that the valve device 13 is for example in the form of, or has, a flap 15. A spring 16 may additionally be provided, which preloads the valve device 13 or the flap 15 into its closed position and thereby constitutes a type of failsafe safety means. In the event of a failure of the actuating device 12, which would for example result in a closure of the valve device 13 being permitted, the spring 16 will in this case lead to closure of the exhaust-gas recirculation valve 13 and thus to protection of the exhaust-gas recirculation cooler 5 against overheating.

Here, in FIG. 1, the valve device 13 is arranged in the exhaust-gas recirculation path 4 upstream of the exhaust-gas recirculation cooler 5, wherein an arrangement of the valve device 13 directly at the inlet side of the exhaust-gas recirculation cooler 5 may self-evidently also be provided, in particular at an inlet diffuser 22, or alternatively at an outlet diffuser 23, wherein the arrangement upstream of the exhaust-gas recirculation cooler 5 is more advantageous. Purely theoretically, the valve device 13 may also be arranged downstream of the exhaust-gas recirculation cooler 5 with equal effectiveness, because in that case, too, exhaust gas 14 no longer flows through the exhaust-gas recirculation cooler 5.

In general, the pressure detection device 10 comprises at least one pressure sensor 11, wherein, in the example shown in FIG. 1, two pressure sensors 11 are provided, which are arranged at the inlet side and outlet side of the exhaust-gas recirculation cooler 5. In this way, by way of the pressure detection device 10, it is additionally possible for a pressure drop in the exhaust-gas recirculation cooler 5 to be monitored, which pressure drop may be used to monitor a free flow cross section in the exhaust-gas recirculation cooler 5. In this way, too, it is possible to detect a relative pressure between the two pressure sensors 11, whereby the detected pressure loss in the coolant circuit 3 or in the exhaust-gas recirculation cooler 5 can be utilized for actuation of the actuating device 12. In this case, it is thus possible for not only a predefined pressure drop but also a reduced coolant throughflow to be utilized for the closure of the valve device 13.

Figure 2:
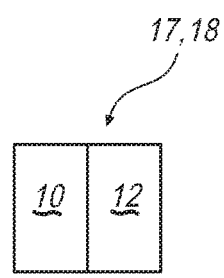
FIG. 2 shows a possible integration of a pressure detection device and of an actuating device into a pressure capsule or a differential pressure capsule.

In a further advantageous embodiment of the solution according to the invention, the pressure detection device 10 and the actuating device 12 may be integrated in a pressure capsule 17 or in a differential pressure capsule 18, as illustrated for example in FIG. 2. It may likewise be provided that the pressure detection device 10 is in the form of a pressure switch, in particular a so-called piezo element 19, and that the actuating device 12 is in the form of an electric actuator 20. In this case, a mechanical change in pressure at the pressure sensor 11 in the form of a piezo element 19, or at the pressure detection device 10 in the form of a piezo element 19, would generate an electrical signal, which would be transmitted to the actuating device 12 and specifically, in this case, to the electric actuator 20, which thereupon controls the valve device 13 correspondingly.

It is likewise conceivable that, in an alternative embodiment, the valve device 13 is integrated into the exhaust-gas recirculation valve 6, such that the latter performs not only the open-loop and closed-loop control of the exhaust gas 14 that is supplied for combustion again, but also the protection of the exhaust-gas recirculation cooler 5 against overheating in the event of a fault occurring in the coolant circuit 3. A valve device 13 integrated in such a manner into the exhaust-gas recirculation valve 6 is in this case illustrated in FIG. 1 merely by dashed lines, and thus as an option. In this case, too, the valve device 13 is positioned upstream of the exhaust-gas recirculation cooler 5 and shuts off the exhaust-gas flow 14, preferably completely, if a predefined pressure drop is detected in the coolant circuit 3. In this case, it would also be possible for the pressure detection device 10 to be connected to an engine control unit 24, which then closes the valve device 13 in the region of the exhaust-gas recirculation valve 6, or else the exhaust-gas recirculation valve 6 itself, in the event of a pressure drop being correspondingly detected in the coolant circuit 6.

In principle, it is conceivable for at least the pressure detection device 10, the actuating device 12 and the valve device 13 to be in the form of an autonomously operating system and to thereby be used in the sense of a stand-alone system, without utilization of the ECU (engine control unit 24). This offers the great advantage that no modifications to the vehicle are necessary during the integration process. Alternatively, it is also conceivable for at least the pressure detection device 10, the actuating device 12 and the valve device 13 to be connected communicatively to the engine control unit 24, and in particular be controlled in closed-loop fashion by the latter, which permits more precise through-flow monitoring.

In general, in the case of all of the proposed solutions, effective protection of the exhaust-gas recirculation cooler 5 against overheating is possible with only marginal additional outlay in terms of construction, in particular if, for example, the exhaust-gas recirculation valve 6 that is provided in any case is utilized for the valve device 13.

The invention claimed is:
1. A cooling system of a motor vehicle, comprising:
a coolant circuit including an exhaust-gas recirculation path and an exhaust-gas recirculation cooler incorporated into the exhaust-gas recirculation path;
a pressure detection device for detecting a coolant pressure in the coolant circuit;
an actuating device, wherein the pressure detection device is connected communicatively to the actuating device;

a valve device connected communicatively to the actuating device and configured to control an exhaust-gas stream passing into the exhaust-gas recirculation cooler, the valve device adjustable between an open position that permits a flow of the exhaust-gas stream into the exhaust-gas recirculation cooler and a closed position that blocks the flow of the exhaust-gas stream into the exhaust-gas recirculation cooler;
wherein the actuating device is configured to at least partially close the valve device and at least reduce the exhaust-gas stream flowing to the exhaust-gas recirculation cooler in response to the pressure detection device detecting a predefined pressure drop in the coolant circuit; and
wherein the valve device is preloaded into the closed position via a spring.

2. The cooling system according to claim 1, wherein the actuating device is configured to move the valve device into the closed position and stop the exhaust-gas stream from flowing into the exhaust-gas recirculation cooler in response to the pressure detection device detecting the predefined pressure drop.

3. The cooling system according to claim 1, wherein the valve device is a flap.

4. The cooling system according to claim 1, wherein at least one of:
the valve device is arranged at the exhaust-gas recirculation cooler on a downstream side or an upstream side in the exhaust-gas recirculation path, and
the valve device is integrated into an exhaust-gas recirculation valve.

5. The cooling system according to claim 1, wherein the pressure detection device includes at least one pressure sensor.

6. The cooling system according to claim 1, wherein the pressure detection device includes at least two pressure sensors arranged in the coolant circuit.

7. The cooling system according to claim 6, wherein the at least two pressure sensors are arranged at an inlet side and at an outlet side of the exhaust-gas recirculation cooler.

8. The cooling system according to claim 7, wherein the valve device is at least partially closed via the actuating device in response to the pressure detection device detecting a relative pressure between the at least two pressure sensors indicating a pressure drop across the exhaust-gas recirculation cooler.

9. The cooling system according to claim 1, wherein at least one of:
the pressure detection device and the actuating device are integrated in a pressure capsule or in a differential-pressure capsule, and
the pressure detection device is configured as a pressure switch, and the actuating device is configured as an electric actuator.

10. The cooling system according to of claim 1, wherein:
at least the pressure detection device, the actuating device and the valve device together form an autonomously operating system, or
at least the pressure detection device, the actuating device and the valve device are connected communicatively to an engine control unit.

11. The cooling system according to claim 1, wherein the pressure detection device includes pressure switch configured as a piezo element and the actuating device includes an electric actuator.

12. The cooling system according to claim 1, wherein the valve device is arranged in the exhaust-gas recirculation path at the exhaust-gas recirculation cooler.

13. A motor vehicle, comprising: a cooling system, the cooling system including:
a cooling circuit including an exhaust-gas recirculation path and an exhaust-gas recirculation cooler arranged in the exhaust-gas recirculation path;
a pressure detection device for detecting a coolant pressure in the coolant circuit, the pressure detection device including at least two pressure sensors arranged in the coolant circuit at an inlet side and an outlet side of the exhaust-gas recirculation cooler, respectively;
an actuating device connected communicatively to the pressure reduction device;
a valve device connected communicatively to the actuating device, the valve device configured to control an exhaust-gas stream passing into the exhaust-gas recirculation cooler;
wherein the actuating device is configured to at least partially close the valve device and impede a flow of the exhaust-gas stream passing into the exhaust-gas recirculation cooler in response to the pressure detection device detecting a predefined pressure drop of the coolant pressure in the coolant circuit; and
wherein the actuating device is further configured to at least partially close the valve device in response to the pressure detection device detecting a relative pressure between the at least two pressure sensors indicating a pressure drop across the exhaust-gas recirculation cooler.

14. The motor vehicle according to claim 13, wherein the valve device includes a flap.

15. The motor vehicle according to claim 13, wherein the pressure detection device and the actuation device are integrated into a pressure capsule.

16. The motor vehicle according to claim 13, wherein the pressure detection device includes a pressure switch and the actuating device includes an electric actuator.

17. The motor vehicle according to claim 13, wherein the valve device is preloaded into a closed position via a spring.

18. The motor vehicle according to claim 13, wherein the pressure detection device, the actuating device and the valve device together form an autonomous operating system.

19. A method for operating a cooling system of a motor vehicle, comprising:
detecting via a pressure detection device a coolant pressure in a coolant circuit, wherein the pressure detection device is connected communicatively to an actuating device and the coolant circuit includes an exhaust-gas recirculation path and an exhaust-gas recirculation cooler;
reducing a flow of an exhaust-gas stream passing into the exhaust-gas recirculation cooler by at least partially closing a valve device via the actuation device in response to the pressure detection device detecting a predefined pressure drop of the coolant pressure in the coolant circuit; and
preloading the valve device via a spring into a closed position to block the flow of the exhaust-gas stream passing into the exhaust-gas recirculation cooler in a failure event of the actuating device.

20. The method according to claim 19, further comprising monitoring via the pressure detection device a relative pressure between at least two pressure sensors disposed in the coolant circuit at an inlet side and an outlet side of the exhaust-gas recirculation cooler, respectively, and closing the valve device at least partially via the actuating device in response to detecting a pressure drop of the relative pressure from the inlet side to the outlet side.

* * * * *